United States Patent [19]

Nowotarski

[11] Patent Number: 4,610,391
[45] Date of Patent: Sep. 9, 1986

[54] PROCESS FOR WAVE SOLDERING

[75] Inventor: Mark S. Nowotarski, Ossining, N.Y.

[73] Assignee: Union Carbide Corporation, Danbury, Conn.

[21] Appl. No.: 682,943

[22] Filed: Dec. 18, 1984

[51] Int. Cl.$^4$ .......................... B23K 1/08; B23K 31/02
[52] U.S. Cl. .................................. 228/219; 228/180.1; 228/37
[58] Field of Search ................................ 228/219–220, 228/180.1, 180.2, 37, 123, 260

[56] References Cited

U.S. PATENT DOCUMENTS

| | | | |
|---|---|---|---|
| 3,445,919 | 5/1969 | Saba | 228/37 X |
| 3,705,457 | 12/1972 | Tardoskegyi | 228/37 X |
| 3,726,007 | 4/1973 | Keller | 228/180.2 X |
| 3,726,465 | 4/1973 | Boynton et al. | 228/37 |
| 3,765,591 | 10/1973 | Cook | 228/36 |
| 3,874,068 | 4/1975 | Cook | 29/471.1 |
| 4,401,253 | 8/1983 | O'Rourke | 228/125 |
| 4,402,448 | 9/1983 | O'Rourke | 228/125 |
| 4,463,891 | 8/1984 | Scheible et al. | 228/37 X |

FOREIGN PATENT DOCUMENTS

| | | |
|---|---|---|
| 53-95854 | 8/1978 | Japan . |
| 54-2343 | 1/1979 | Japan . |
| 58-52899 | 3/1983 | Japan . |
| 58-48991 | 3/1983 | Japan . |

OTHER PUBLICATIONS

Wassink, Electrochemical Publications Ltd., Ayr, Scotland, 1984, pp. 332 to 361.

*Primary Examiner*—Kuang Y. Lin
*Attorney, Agent, or Firm*—Saul R. Bresch; Stanley Ktorides

[57] ABSTRACT

In a process for wave soldering a work-piece in an atmosphere consisting essentially of air wherein (i) there is a first portion of the solder wave in which fluid motion can be observed, said first portion including an active dross forming area and (ii) there is a second portion of the solder wave, which is the last portion of the solder wave with which the work-piece comes into contact, the improvement comprising (a) subject to step (b), replacing the atmosphere in contact with at least about 50 percent of the surface of the active dross forming area with an inert gas; and (b) preventing the atmosphere in contact with the surface of the second portion from becoming inert regardless of whether the first and second portions overlap.

7 Claims, 1 Drawing Figure

U.S. Patent Sep. 9, 1986 4,610,391
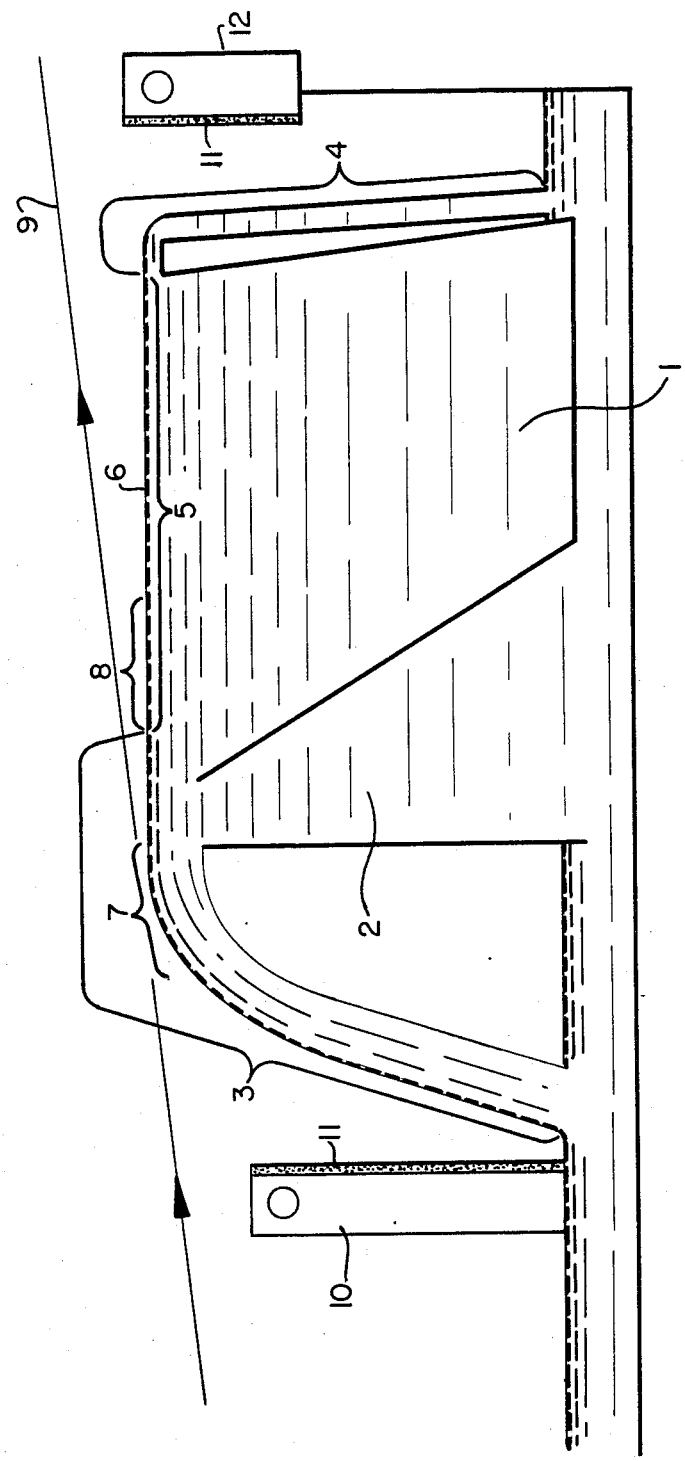

PROCESS FOR WAVE SOLDERING

TECHNICAL FIELD

This invention relates to a process for wave soldering.

BACKGROUND ART

Wave soldering is a technique for joining electronic devices or pretinning metallic components. It is accomplished by bringing the components in contact with at least one standing wave of molten solder. The process is described in "Soldering in Electronics", by R. J. Wassink, Electrochemical Publications Ltd., Ayr, Scotland, 1984, pages 332 to 361, which is incorporated by reference herein.

The process typically, but not necessarily, includes the application of a flux to the surfaces to be wet by the solder. The flux treats the surfaces so that the solder will adhere to them. The flux covered surfaces are commonly heated prior to soldering in order to dry and activate the flux and reduce thermal shock.

A solder wave is formed by pumping molten solder, contained within a solder pot, up through a nozzle to provide a standing wave. Usually, only one wave is formed, but dual waves are also employed, particularly when surface mounted devices are being soldered to printed circuit boards. Solder cascades and solder jets find application in wave soldering also.

One of the problems encountered with wave soldering is that the molten solder oxidizes when exposed to oxygen. The oxidized solder forms a surface oxide layer, which must be removed by a flux before the components being soldered will wet. The surface layer is continually broken by the flow of solder in the wave. This exposes fresh solder which, in turn, is also oxidized. A mixture of oxide and solder, thus, collects within the solder pot. This mixture is known as dross, which must be removed and disposed of. Dross generation adds to the cost of the process due to the lost value of the solder and the maintenance time required to remove it and repair mechanical parts of the wave soldering apparatus damaged by the abrasive action of the dross. Dross can also be a health hazard when the metals or oxides in it are toxic, e.g., lead or lead oxide. The hazard may surface when workers handle the dross in removing it from the solder pot or when removal of the dross results in the suspension of dross particles in ambient air and their subsequent inhalation.

One method employed to minimize the formation of oxide on the solder wave is to cover the surface with an oil. This is effective in protecting the solder from atmospheric oxygen, but the oil degrades and must be replaced periodically. Furthermore, the oils commonly used are difficult to clean off of the components being soldered and can produce a great deal of smoke at wave soldering temperatures.

A more satisfactory technique, which has been suggested for the reduction of dross formation, is blanketing the entire surface with an inert atmosphere, i.e., replacing the air or oxygen residing on and above the surface of the wave with an inert gas. Unfortunately, this results in an increased incidence of a phenomenon known as bridge formation. "Bridges" are solder joints formed between components or parts of components, which are not intended to be joined. In electronic devices, a bridge leads to a short circuit.

DISCLOSURE OF THE INVENTION

An object of this invention, therefore, is to provide a process for wave soldering wherein dross formation is substantially reduced and wetting is improved without increasing bridging.

Other objects and advantages will become apparent hereinafter.

According to the present invention, an improvement has been discovered in a process for wave soldering a work-piece in an atmosphere consisting essentially of air wherein (i) there is a first portion of the solder wave in which fluid motion can be observed, said first portion including an active dross forming area, and (ii) there is a second portion of the solder wave, which is the last portion of the solder wave with which the work-piece comes into contact.

The improvement comprises:

(a) subject to step (b), replacing the atmosphere in contact with at least about 50 percent of the surface of the active dross forming area with an inert gas; and (b) preventing the atmosphere in contact with the surface of the second portion from becoming inert regardless of whether the first and second portions overlap.

BRIEF DESCRIPTION OF THE DRAWING

The sole FIGURE is a schematic drawing of a side view cross-section of an embodiment of an apparatus in which subject process can be carried out.

DETAILED DESCRIPTION

Referring to the drawing:

The apparatus shown in the drawing can be referred to as a single wave solder pot. The particular wave illustrated is a "lambda" wave. This wave is commonly used to solder components to electronic circuit boards.

The "first portion of the solder wave in which fluid motion can be observed" is represented by front overflow 3 including wetting region 7, rear overflow 4, and quiescent area 5. The "second portion of the solder wave" is represented by peel off region 8 and is the last portion of the solder wave with which the work-piece comes in contact. The first and second portions make up wave 6 and, in the drawing, overlap. Regardless of the overlap, it is a requirement of this process that the atmosphere in contact with the surface of the second portion or peel off region 8 be prevented from becoming inert. This may be accomplished by preventing inert gas from reaching that point and displacing the air, by introducing more air into the region, or, and preferably, by enriching the air present at peel off region 8 with oxygen or another surface active fluid. A surface active fluid is one which will either react with the solder to form a solid skin, such as oxygen or hydrogen sulfide, or one which will reduce the surface tension, such as solder wave oil or flux. The discussion below will assume that the surface active fluid is a gas although it is contemplated that fluids or fluid sprays of surface active fluids will work as well.

The term "fluid motion" refers to the movement of the molten solder. The movement is easily observed at front overflow 3 and rear overflow 4, but is not as readily observed in quiescent area 5.

The term "work-piece" is considered to include two or more components being joined together or one or more components being pretinned.

Solder 1 is heated by electric heating elements (not shown) to a temperature above its liquidus. Solder for electronic circuit board applications, as in the drawing, typically has a composition comprising about 50 to about 70 percent by weight tin with the balance being lead. A small amount of antimony, about 2 percent by weight of the composition, is also included. Solder, however, is defined as any metal or mixture of metals, which has a solidus less than that of the surfaces to be wetted, i.e., the surfaces to be joined or pretinned. The molten solder is pumped up the inside of converging nozzle 2 and most of it flows down front overflow 3. The balance of the solder flows over rear overflow 4 or through drain holes (not shown).

Dross forms everywhere in the first portion of the wave. Within the first portion, however, some areas produce more dross than others. Any area within the first portion in which the surface oxide is observed to break up is referred to as an "active dross forming area". Front overflow 3 and rear overflow 4 are both active dross forming areas. For the wave design shown in the drawing, about 75 percent of the dross is produced in front overflow 3, 20 percent in rear overflow 4, and only 5 percent is quiescent area 5.

Wetting region 7 is the upper part of front overflow 3. This is the region where the solder wave first comes in contact with the surface of the component to be soldered. The use of a flux prevents the oxide layer forming in the region from inhibiting the wetting of the component with the solder.

Peel off region 8 is located at the beginning of quiescent portion 5 of wave 6, typically, about the first two inches of that portion. The "peel off" region is defined as the portion of the wave, which is last in contact with the component being soldered. The circuit board (not shown) is conveyed in the position and direction of arrowed line 9 in such a manner that the bottom surface of the circuit board comes in contact with wave 6 at a depth in the molten solder of no greater than the thickness of the board.

The components to be soldered or pretinned are exemplified by printed circuit boards and electronic devices such as wires, capacitors, resistors, integrated circuits, and transistors.

A flux, e.g., an activated rosin flux with a 20 percent by weight solid content, is first applied to the components to be soldered. Other fluxes that can be mentioned for use in subject process are various organic acids, water soluble inorganic acids, and halide salts such as zinc chloride, all conventionally used for fluxing. One commercially available flux is HI-GRADE #784 rosin flux, which is a rosin-activated flux compound of a high purity rosin blended with a solvent, manufactured by Hi-Grade Alloy Corporation of East Hazelcrest, Ill.

The components can be preheated to a temperature which is usually about 200° F. as measured at the top of the components. The preheating is generally accomplished from the bottom, top, or both, using hot air, convection, infrared radiation, or a combination thereof.

Front overflow 3, including the wetting region 7, is blanketed with an inert gas using front gas diffuser 10. The inert gas, of course, displaces the air. The diffuser is, typically, a rectangular box constructed of, for example, AISI 316 stainless steel. Any material, however, which can tolerate the solder temperature and is neither attacked by the flux nor wet by the solder is suitable. All sides of the diffuser are impermeable to the gas except the side facing wave 6, which is porous. Porous diffuser wall 11 acts to distribute the inert gas uniformly and with minimal turbulence over front overflow 3 of wave 6. Front gas diffuser 10 is mounted on the apparatus as close to wave 6 as practical and as high as possible provided that it avoids htting the component leads mounted on the circuit board being soldered. The diffuser should also be as wide as wave 6. Side shields (not shown) are placed at the sides of wave 6 extending upward above the wave in order to prevent air infiltration from the sides.

An area is considered to be inert when the oxygen level measured in the area is less than about one percent by volume. It is not necessary for each area to be inert to that extent, however. In the active dross forming area, the atmosphere in contact at least about 50 percent of the surface of the solder wave should be replaced by an inert gas, and preferably the atmosphere in contact with at least about 70 percent of the surface should be replaced. The atmosphere in the quiescent area can be left as it is. It is preferred, however, that the first portion be treated the same as the active dross forming area. The optimum is to make the atmosphere in contact with the first portion inert as defined above.

Suitable inert gases include any gas or mixture of gases which will not react with the solder at soldering temperatures to form a solid oxide or other reaction product. Examples of inert gases useful with all metallic solders are nitrogen, the noble gases, and reducing gases such as hydrogen. For typical tin/lead solders melting at temperatures below 600 degrees F., slightly oxidizing gases such as carbon dioxide and water vapor are also effective. Mixtures of inert gases can also be used if desired. Nitrogen is the preferred inert gas due to its relatively low cost, availability, and nearly neutral density relative to air.

Nitrogen is passed through front gas diffuser 10 at a rate of at least about 80 normal cubic feet per hour per foot of wave width (ncfh/ft) and preferably about 240 ncfh/ft. This diffuser can bring the atmosphere at front overflow 3 to a point where it measures less than about 100 ppm using about 240 ncfh/ft.

Rear gas diffuser 12 is similar in design to front gas diffuser 10, but other diffuser designs can be used for both such as a tubular porous metal filter element in combination with a metal cover to assist in directing the flow of inert gas. Three diffusers can be used in the case of a dual wave apparatus with covers and curtains to contain the flow of inert gas. The various apparatuses can also be enclosed in order to control the gas flow.

The function of rear gas diffuser 12 is to introduce an oxidizing or other surface active fluid, other than air, into the process. If no gas is introduced into rear gas diffuser 12, then, air will be present at peel off region 8. The rate of introduction of an oxidizing or other surface active gas is at least 80 ncfh/ft and preferably about 160 ncfh/ft. The oxidizing gas is directed in such a manner that it is trapped underneath the circuit board insuring a non-inert condition at peel off region 8. Other surface active fluids are introduced in a similar manner. The oxygen content of the atmosphere in peel off region 8 ranges from about 18 percent to about 50 percent by volume and is preferably in the range of about 25 to about 35 percent by volume. The optimum oxygen percent will vary with the specific flux and operating conditions. With one particular flux, for example, the bridging rate at 35 percent oxygen in nitrogen (by volume) is observed to be three times lower than the bridging rate at 21 percent oxygen in nitrogen.

In the case where no surface active fluid, gas or liquid, is used, the inert gas, which can be introduced from one or both diffusers, must be injected in such a manner that as much air as possible remains in peel off region 8.

The advantages of subject process are as follows:
1. reduction in dross formation;
2. improvement in component wettability;
3. reduction of flux decomposition;
4. reduction of bridging;
5. an inert wetting region means more consistent wetting and the capability of using fluxes having lower activity;
6. reduced maintenance of solder pot and pump (not shown) and improved safety as incidental benefits of dross reduction, mentioned above.

It will be understood by those skilled in the art that the wave soldering apparatus can be designed in various ways to accommodate the single and dual waves and the various components which it is designed to solder. As long as the required process steps, i.e., causing the atmosphere covering at least some of the first portion, preferably the active dross forming areas, to be inert and preventing the atmosphere covering the second portion from being inert, are followed, the design, number, and placement of the diffusers can be varied to a great extent.

The invention is illustrated by the following example:

The wave soldering apparatus and process used is that described in the drawing and above. Its dimensions are: 9 inches in length, 15 inches in width, and 3 inches in height. Nitrogen is passed through front gas diffuser 10 at a rate of 500 ncfh./ft. A blend of 30 percent oxygen and 70 percent nitrogen is passed through rear diffuser 12 at a rate of 200 ncfh/ft.

An electronic circuit board with 7,40 pin dual on-line package integrated circuits and other electronic components including bottom mounted leadless devices to be joined by soldering is conveyed along arrowed line 9 at a rate of 8 feet per minute. The components to be soldered are coated with a mildly activated rosin flux and the board is preheated by convection from the bottom to a temperature of 200° F., measured on the top, both prior to entry of the board into the solder bath.

The solder is comprised of 59 percent tin, 39 percent lead, and 2 percent antimony (by weight) and is at a temperature of 500° F. in the solder pot. The molten solder is at a depth of 0.55 inch measured along a vertical line from the top of nozzle 2 to the surface of the solder.

The atmosphere at front overflow 3 measures 100 ppm of oxygen (by volume). It is also noted that the atmosphere in contact with at least 50 percent of the surface of the active dross forming area is replaced by nitrogen. After the introduction of the oxygen/nitrogen blend, the oxygen content measures 28 to 30 percent (by volume) of the atmosphere at peel off region 8.

Dross formation is measured (i) prior to introduction of gas through the diffusers to be 2.5 pounds per hour and (ii) after introduction of inert gas through front gas diffuser 10 to be 0.3 pounds per hour.

The number of bridges per board is measured (i) after introduction of inert gas through first gas diffuser 10 to average 0.03±0.01 bridges per board and (ii) after introduction of the oxygen/nitrogen blend through rear gas diffuser 12 to average 0.01±0.008 bridges per board. The average is based on 200 boards.

I claim:

1. In a process for wave soldering a work-piece in an atmosphere consisting essentially of air wherein (i) there is a first portion of the solder wave in which fluid motion can be observed, said first portion including an active dross forming area, and (ii) there is a second portion of the solder wave, which is the last portion of the solder wave with which the work-piece comes into contact, the improvement comprising
   (a) subject to step (b), replacing the atmosphere in contact with at least about 50 percent of the surface of the active dross forming area with an inert gas; and
   (b) maintaining the atmosphere in contact with the surface of the second portion as an oxidizing gas regardless of whether the first and second portions overlap.

2. The process defined in claim 1 wherein the atmosphere in contact with the surface of the second portion is enriched with oxygen.

3. The process defined in claim 1 wherein the atmosphere in contact with the surface of the first portion contains no more than about one percent oxygen by volume.

4. The process defined in claim 1 wherein the atmosphere in contact with the surface of the second portion contains at least about eighteen percent oxygen.

5. The process defined in claim 4 wherein the atmosphere in contact with the surface of the second portion contains no more than about 50% by volume of oxygen.

6. The process defined in claim 1 wherein the atmosphere in contact with the wetting region of the wave is inert.

7. The process defined in claim 1 wherein the atmosphere in contact with at least about 70 percent of the active dross forming area of the first portion is inert.

* * * * *